(12) United States Patent
Tapscott

(10) Patent No.: US 12,090,805 B2
(45) Date of Patent: Sep. 17, 2024

(54) INDEPENDENT SUSPENSION WITH AIRBAG

(71) Applicant: CRUISEMASTER AUSTRALIA PTY LTD, Geebung (AU)

(72) Inventor: James Edward Tapscott, Northgate (AU)

(73) Assignee: CRUISEMASTER AUSTRALIA PTY LTD, Geebung (AU)

( * ) Notice: Subject to any disclaimer, the term of this patent is extended or adjusted under 35 U.S.C. 154(b) by 164 days.

(21) Appl. No.: 17/764,020

(22) PCT Filed: Sep. 27, 2020

(86) PCT No.: PCT/AU2020/051030
§ 371 (c)(1),
(2) Date: Mar. 25, 2022

(87) PCT Pub. No.: WO2021/056079
PCT Pub. Date: Apr. 1, 2021

(65) Prior Publication Data
US 2022/0371391 A1 Nov. 24, 2022

(30) Foreign Application Priority Data

Sep. 27, 2019 (AU) .............................. 2019903648
Oct. 3, 2019 (AU) ............................... 2019903715

(51) Int. Cl.
*B60G 11/28* (2006.01)
*B60G 7/00* (2006.01)
*B60G 9/00* (2006.01)

(52) U.S. Cl.
CPC .............. *B60G 11/28* (2013.01); *B60G 7/001* (2013.01); *B60G 9/003* (2013.01);
(Continued)

(58) Field of Classification Search
CPC .............. B60G 9/003; B60G 2204/128; B60G 2204/127; B60G 2204/416; B60G 11/28;
(Continued)

(56) References Cited

U.S. PATENT DOCUMENTS 2,806,713 A * 9/1957 Muller ................... B60G 11/52
267/66
2,947,547 A * 8/1960 Gouirand ............. B62D 53/062
280/43.23

(Continued)

FOREIGN PATENT DOCUMENTS

| CA | 2410776 | 5/2004 |
| CN | 207225470 | 4/2018 |

(Continued)

OTHER PUBLICATIONS

International Search Report and Written Opinion of the International Searching Authority (ISA/AU) mailed Dec. 11, 2020 in International PCT Application No. PCT/AU20/51030 filed Sep. 27, 2020.

(Continued)

*Primary Examiner* — Timothy Wilhelm
(74) *Attorney, Agent, or Firm* — Sorell, Lenna & Schmidt, LLP

(57) ABSTRACT

An independent suspension assembly for a vehicle, said assembly including: a suspension arm pivotally attachable at a first end to a point fast with the vehicle; a support member for rigid attachment of a lower end of a resilient member at a remote end of the suspension arm the resilient member having a remote side and a near side, the remote side being further from said point than the near side; and a pivoting mounting assembly attachable to the vehicle for attachment of an upper end of the resilient member; wherein pivoting of the suspension arm causes the resilient member to elicit pivoting of the pivoting assembly for minimizing a differ- (Continued)

ence in lengthening between the remote and near sides of the resilient member.

18 Claims, 13 Drawing Sheets

(52) U.S. Cl.
CPC .. *B60G 2202/152* (2013.01); *B60G 2204/126* (2013.01); *B60G 2204/41* (2013.01); *B60G 2300/04* (2013.01)

(58) Field of Classification Search
CPC .............. B60G 2204/126; B60G 7/001; B60G 2202/152; B60G 2204/41; B60G 2300/04; B60G 2204/418; B60G 3/145; B60G 5/06; B60G 7/02; F16F 9/54; F16F 9/02; B62D 63/08
See application file for complete search history.

(56) References Cited

U.S. PATENT DOCUMENTS

| | | | | |
|---|---|---|---|---|
| 3,046,003 A * | 7/1962 | Schultz | ................ | B60G 15/12 267/64.24 |
| 3,078,104 A | 2/1963 | Chalmers | | |
| 4,261,597 A * | 4/1981 | Vandenberg | ........... | B62D 17/00 280/86.75 |
| 4,309,045 A * | 1/1982 | Raidel | ................ | B60G 7/00 280/124.116 |
| 5,058,916 A * | 10/1991 | Hicks | ................ | B62D 61/12 180/209 |
| 5,253,853 A * | 10/1993 | Conaway | ................ | B60G 99/00 248/564 |
| 5,403,031 A | 8/1995 | Gottschalk et al. | | |
| 5,505,481 A * | 4/1996 | VanDenberg | .......... | B60G 11/27 280/124.157 |
| 5,588,665 A * | 12/1996 | Pierce | ................ | B60G 9/02 180/209 |
| 5,655,788 A * | 8/1997 | Peaker | ................ | B60G 17/005 280/86.5 |
| 5,855,378 A * | 1/1999 | Capehart | ................ | B60P 1/027 280/124.179 |
| 5,863,049 A * | 1/1999 | Mahvi | ................ | B60P 1/027 280/6.151 |
| 5,996,980 A * | 12/1999 | Frey | ................ | F16F 9/05 267/64.27 |
| 6,062,578 A | 5/2000 | Richardson | | |
| 6,921,065 B2 * | 7/2005 | Oldenettel | ................ | F16F 9/0454 267/64.27 |
| 7,036,805 B2 * | 5/2006 | Renaudot | ................ | B60G 21/05 280/124.157 |
| 7,396,028 B2 * | 7/2008 | Smith | ................ | B62D 61/125 280/86.5 |
| 7,866,681 B1 | 1/2011 | Shahly et al. | | |
| 7,891,679 B2 * | 2/2011 | Svartz | ................ | B60G 7/006 280/86.75 |
| 7,900,941 B2 * | 3/2011 | Lundmark | ........ | B60G 21/0551 267/260 |
| 7,900,942 B2 * | 3/2011 | Koschinat | ................ | B60G 7/008 280/124.128 |
| 7,918,465 B2 * | 4/2011 | Metzger | ................ | B60P 1/027 280/439 |
| 7,934,734 B2 * | 5/2011 | Billian | ................ | B60G 9/003 280/124.116 |
| 7,997,598 B2 | 8/2011 | Ralph et al. | | |
| 8,322,734 B2 * | 12/2012 | Yao | ................ | B60G 9/003 280/86.5 |
| 8,651,510 B2 * | 2/2014 | Fankhauser | ........ | B60G 17/0523 280/490.1 |
| 8,770,604 B2 * | 7/2014 | Brereton | ................ | B60G 7/001 280/124.108 |
| 8,910,961 B2 * | 12/2014 | Galazin | ................ | B60G 9/003 280/124.128 |
| 8,955,858 B2 * | 2/2015 | Koontz | ................ | B60G 5/02 280/124.11 |
| 9,327,575 B2 * | 5/2016 | Kim | ................ | F16F 9/049 |
| 9,656,529 B2 * | 5/2017 | Bartolozzi | ................ | F16F 9/58 |
| 9,707,999 B2 * | 7/2017 | Spielmann | ............. | B60G 9/003 |
| 10,807,461 B2 * | 10/2020 | Batsch | ................ | B60K 7/0007 |
| 11,472,246 B2 * | 10/2022 | Bosschieter | ......... | B60G 17/017 |
| 2001/0011804 A1 * | 8/2001 | Bradshaw | ................ | B60G 11/28 280/124.1 |
| 2002/0190492 A1 * | 12/2002 | Strong | ................ | B60G 3/14 280/124.128 |
| 2006/0083586 A1 | 4/2006 | Fuller et al. | | |
| 2007/0222169 A1 * | 9/2007 | Smith | ................ | B60G 11/27 280/124.157 |

FOREIGN PATENT DOCUMENTS

| | | |
|---|---|---|
| EP | 2628615 | 8/2013 |
| EP | 2990240 | 3/2016 |
| WO | 2019/018885 | 1/2019 |

OTHER PUBLICATIONS

International type search for provisional patent application dated Jul. 31, 2020 issued by the Australian IP Office in Australian Appl. No. 2019903648 filed Sep. 27, 2019.
PCT International Preliminary Report on Patentability dated May 5, 2021 from the International Preliminary Examining Authority in International Application No. PCT/AU2020/051030 filed Sep. 27, 2020.

* cited by examiner

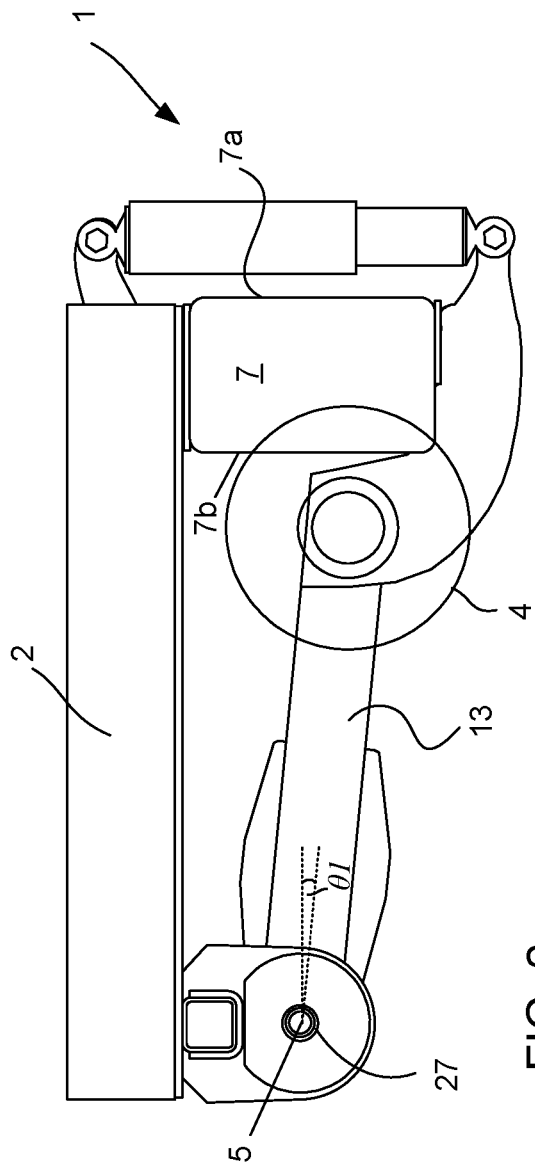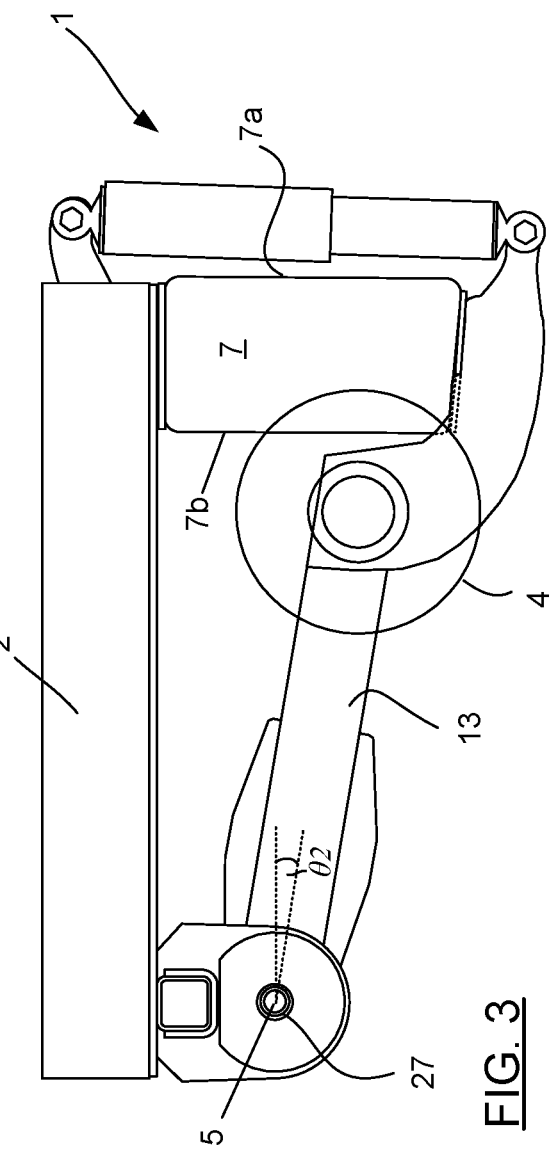

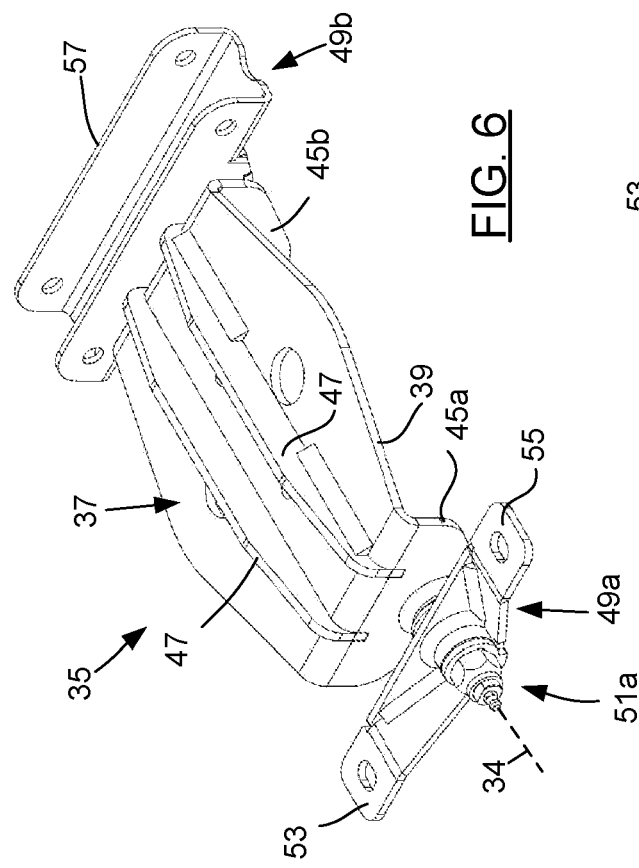
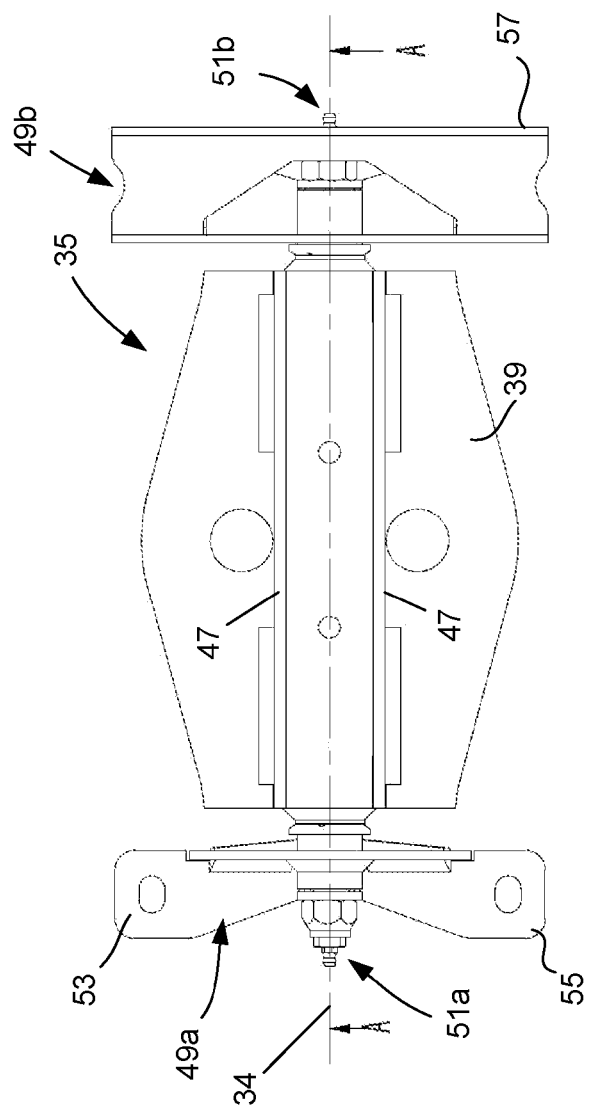

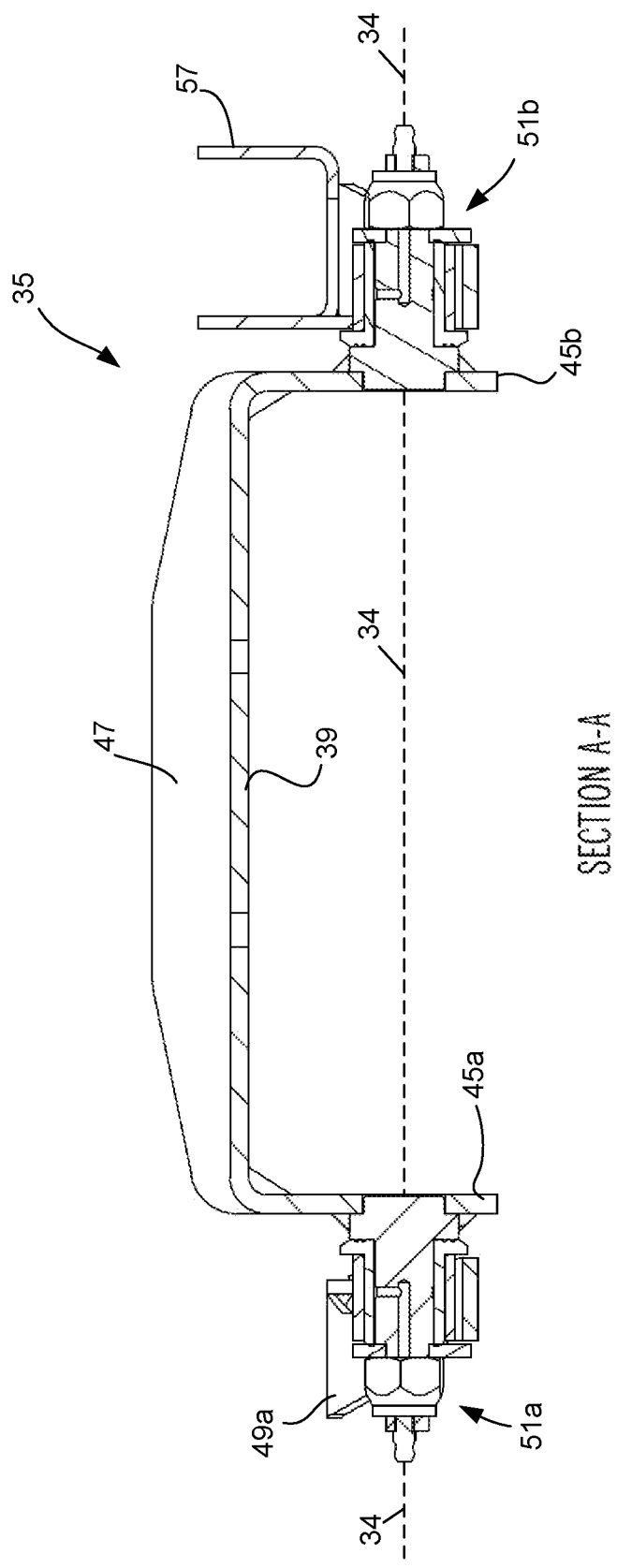

INDEPENDENT SUSPENSION WITH AIRBAG

RELATED APPLICATIONS

The present application claims priority from Australian provisional patent application Number 2019903648 filed 27 Sep. 2019 and Australian provisional patent application Number 2019903715 filed 3 Oct. 2019, the content of which are both hereby incorporated herein in its entirety.

TECHNICAL FIELD

The present invention is directed to an independent suspension assembly for a vehicle. The invention may be used with a towed vehicle such as a trailer, for example a box trailer or a caravan.

BACKGROUND

Any references to methods, apparatus or documents of the prior art are not to be taken as constituting any evidence or admission that they formed, or form part of the common general knowledge.

Independent suspension assemblies are popular for vehicles such as box trailers and caravans that are intended to travel over uneven roads and tracks. For example, FIG. 1 depicts an independent suspension assembly 1 of the present applicant's design which is the subject of Australian patent application No. 2016202202. The suspension assembly 1 is shown mounted to members of a chassis of a vehicle such as a chassis 2 of a trailer by a pair of spaced hinge side plates 23, 25. Between the hinge side plates 23, 25 is a rotatably supported hinge tube assembly 27 that includes a hinge tube 21 from which a trailing suspension arm 13 extends. The hinge tube and suspension arm 13 pivot about the hinge axis 5 of the hinge tube 27 in use.

A remote end of the suspension arm 13 terminates in a bracket 14 which supports a lower end or base 3 of a resilient member in the form of an airbag 7. An upper end 8 of the airbag 7 is fastened to upper mounting plate 9, which is part of a frame attachment bracket 15 that is fastened to a transverse structural member 10 of the trailer chassis 2.

A shock absorber 19 is coupled between the support bracket 14 and the frame attachment bracket 15 to supplement the air bag 7.

A stub axle 17 extends laterally from the suspension arm 13 and a wheel hub 4 is rotatably mounted thereto for mounting a wheel with tyre.

As the trailer travels over rough ground the wheel is presented with upward forces, for example due to protrusions in the ground and downward force due to gravity as it travels over a depression in the ground. Those forces cause the arm 13 and hinge tube 27 from which the arm extends, to pivot about the hinge axis 5. Airbag 7 and shock absorber 19 act to dampen the forces and even-out their effect on the trailer.

Although the suspension assembly 1 that is illustrated in FIG. 1 has been found to work very well, nevertheless, there is scope for improvement. For example, it would be advantageous if uneven wear of the airbag 7 could be reduced. It would also be advantageous if the amount of travel for a given airbag could be increased. so that the effect of the air bag in dampening the forces exerted on the wheel and was improved.

It is an object of the invention to provide an independent suspension assembly that is an improvement, or at least a useful alternative, to those suspension assemblies that have hitherto been known in the prior art and which addresses at least one of the areas for improvement that have been described.

SUMMARY OF THE INVENTION

According to a first aspect of the present invention there is provided an independent suspension assembly for a vehicle, the suspension assembly including:
  a suspension arm having a first end arranged for pivoting relative to the vehicle about a hinge axis;
  a resilient member having a resilient member axis with an axial length varying between a first axial length in a compressed state of the resilient member and a second axial length in an extended state of the resilient member, the resilient member having remote and near sides relative to the hinge axis and a lower end extending from the near side to the remote side, the lower end being rigidly fastened to the suspension arm;
    a pivoting mounting assembly attachable to the vehicle and defining a resilient member pivot axis, an upper end of the resilient member being fast with a pivot member of the pivoting mounting assembly whereby the resilient member is pivotable about the resilient member pivot axis;
    wherein as the suspension arm pivots about the hinge axis the axial length and orientation of the resilient member varies whereby the pivot member pivots about the resilient member pivot axis, the pivoting of the suspension arm and the pivoting of the pivoting mounting assembly being in a common direction to thereby reduce a difference in lengthening between the remote and near sides of the resilient member.

In an embodiment the resilient member comprises an airbag.

In an embodiment the pivoting mounting assembly comprises at least one pivot axle defining the resilient member pivot axis.

In an embodiment the resilient member pivot axis is below the upper end of the resilient member.

In an embodiment the pivoting mounting assembly includes a pivot member across the upper end of the resilient member.

In an embodiment wherein the at least one pivot axle includes portions extending from opposite sides of the pivot member.

In an embodiment the pivot member comprises a pivot plate.

In an embodiment first and second pivot assemblies extend from opposed sides of the pivot plate.

In an embodiment the first and second pivot assemblies each comprise a respective pivot stub axle.

In an embodiment each pivot stub axle includes a base portion.

In an embodiment each base portion locates within holes of respective mounting plates of the pivoting mounting assembly.

In an embodiment each pivot stub axle is non-rotatable relative to the pivot member.

In an embodiment the first and second pivot assemblies each include a spindle portion.

In an embodiment each pivot assembly includes a bush that locates about the spindle portion.

In an embodiment each pivot stub axle has an associated radially extending member.

In an embodiment the radially extending member comprises a tab from a washer that locates non-rotationally around a portion of each respective pivot stub axle.

In an embodiment each radially extending member is restricted to pivot within a limited range.

In an embodiment each radially extending member is restricted to pivot within a limited range by abutting edges of a respective recess of a respective member of the pivoting mounting assembly.

In an embodiment the independent suspension assembly includes a support member that extends from an end of the suspension arm remote from the hinge axis, wherein the lower end of the resilient member is rigidly fastened to the suspension arm.

In an embodiment the support member makes an angle (θ4) of between 150 and 162 degrees with a radial line (R) extending from the hinge axis to an intersection of the lower end of the resilient member and the axis of the resilient member.

In an embodiment the support member makes an angle (θ4) of between 153 and 159 degrees with the radial line (R) extending from the hinge axis to the intersection of the lower end of the resilient member and the axis of the resilient member.

In an embodiment the support member makes an angle (θ4) of 156 degrees with the radial line (R) extending from the hinge axis to the intersection of the lower end of the resilient member and the axis of the resilient member.

In an embodiment a ratio of the length (L2) of the resilient member in a fully extended state to the length of the resilient member in a fully compressed state is between 2.0 and 3.0.

In an embodiment a ratio of the length of the resilient member in a fully extended state to the length of the resilient member in a fully compressed state is 2.5.

In an embodiment a ratio of a radius (R1) of an arc of pivoting (A) of the lower end of the resilient member to the length (L2) of the resilient member in the fully extended state is in the range of 1.2 to 1.6.

In an embodiment the ratio of the radius (R1) of the arc of pivoting (A) of the lower end of the resilient member to the length (L2) of the resilient member in the fully extended state is 1.4

In an embodiment the resilient member comprises a coil spring or a non-pneumatic synthetic rubber member.

In an embodiment the suspension arm is pivotally attached at the first end thereof to the point fast with the vehicle.

In an embodiment the resilient member pivot axis is located above the hinge axis.

In an embodiment a stub axle for a wheel extends laterally between the hinge axis and an end of the support member.

According to a further aspect of the present invention there is provided an independent suspension assembly for a vehicle, the suspension assembly including:
- a suspension arm having an end arranged for pivoting relative to the vehicle;
- a pivoting mounting member attachable to the vehicle; and
- an airbag having a lower end for attaching fast with the suspension arm and an upper end for attaching to the pivoting mounting member.

According to another aspect of the present invention there is provided an independent suspension assembly for a vehicle, the suspension assembly including:
- a suspension arm having an end pivotal relative to the vehicle;
- a pivoting mounting member attached to the vehicle; and
- an airbag having a lower end fast with the suspension arm and an upper end fast with the pivoting mounting member.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2 is a simplified side view of the assembly of FIG. 1 with suspension arm pivoted at a first angle.

FIG. 3 is a simplified side view of the assembly of FIG. 1 with suspension arm pivoted to a second, greater, angle than in FIG. 2.

FIGS. 6 to 8 are views of a pivoting mounting assembly of the independent suspension assembly.

DETAILED DESCRIPTION OF PREFERRED EMBODIMENTS

Figure 1:
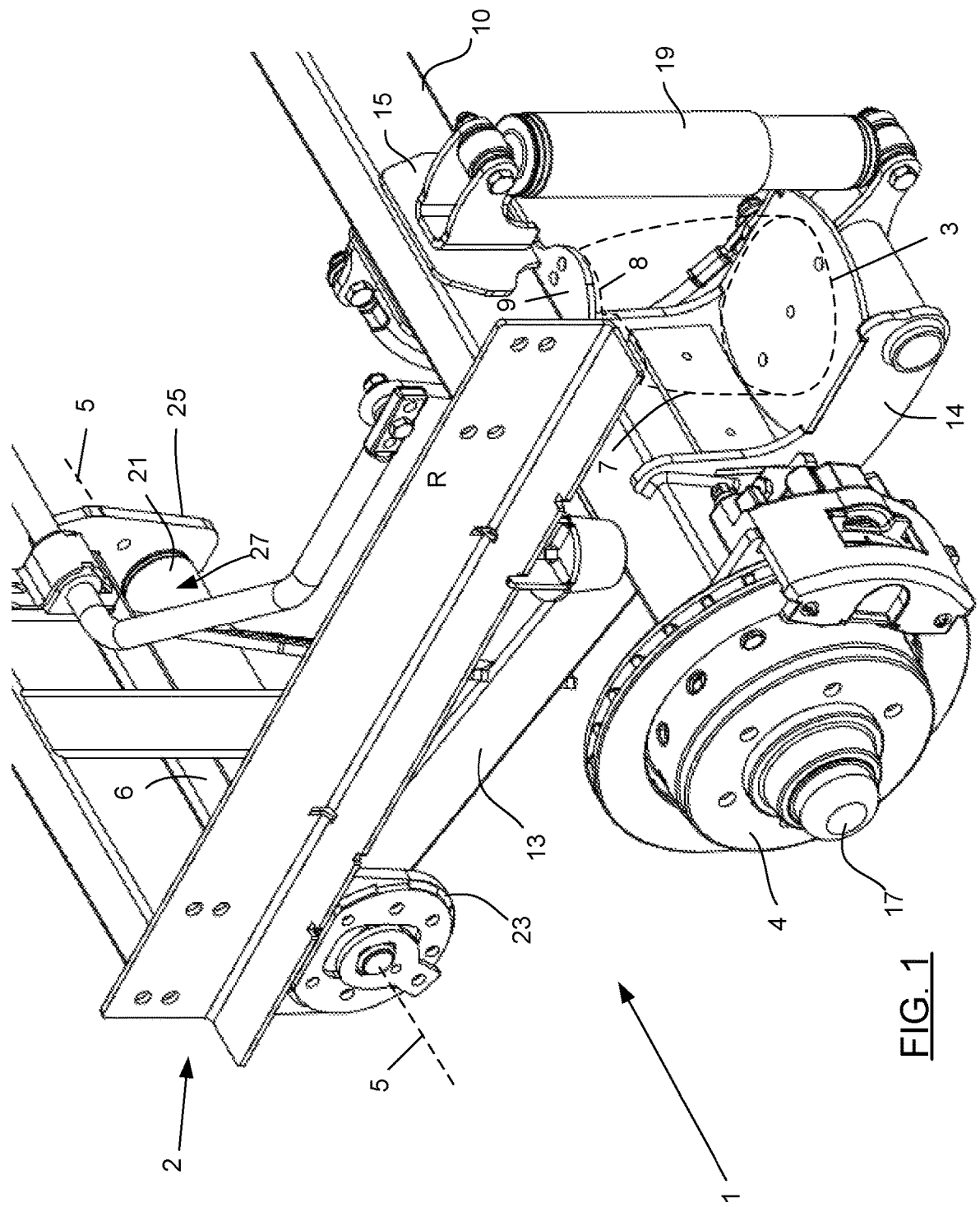
FIG. 1 is a view of a prior art independent suspension assembly installed on members of a trailer chassis.

FIG. 2 is a somewhat simplified side view of the suspension assembly 1 of FIG. 1 wherein the arm 13 is declined at a first angle 81 from the horizontal. FIG. 3 shows the suspension assembly 1 subsequently as the wheel travels over a depression so that the arm 13 is declined at a second angle 82 that is greater than θ1. The Inventor has realised that the remote side 7a of the resilient member, shown in the form of air bag 7, that is furthest from the hinge axis 5 of the hinge tube 27, is subject to a greater lengthening than the near side 7b. Lengthening of each side of the airbag is proportional to the distance of that side of the airbag to the hinge axis 5 multiplied by the angle (in radians) of pivoting of the arm.

Consequently, over time it is believed that the remote side 7a of the airbag 7 is stretched and compressed over a greater range of travel than the near side 7b. Without wishing to be bound by theory, it is believed that one result of this is that uneven wear of the bag 7 may occur. It is also believed that elasticity of the remote regions of the bag, e.g. remote side 7a may be regions which place the most substantial limit on the degree of travel that the resilient member, presently illustrated in the form of airbag 7, can accommodate.

Figure 3A:
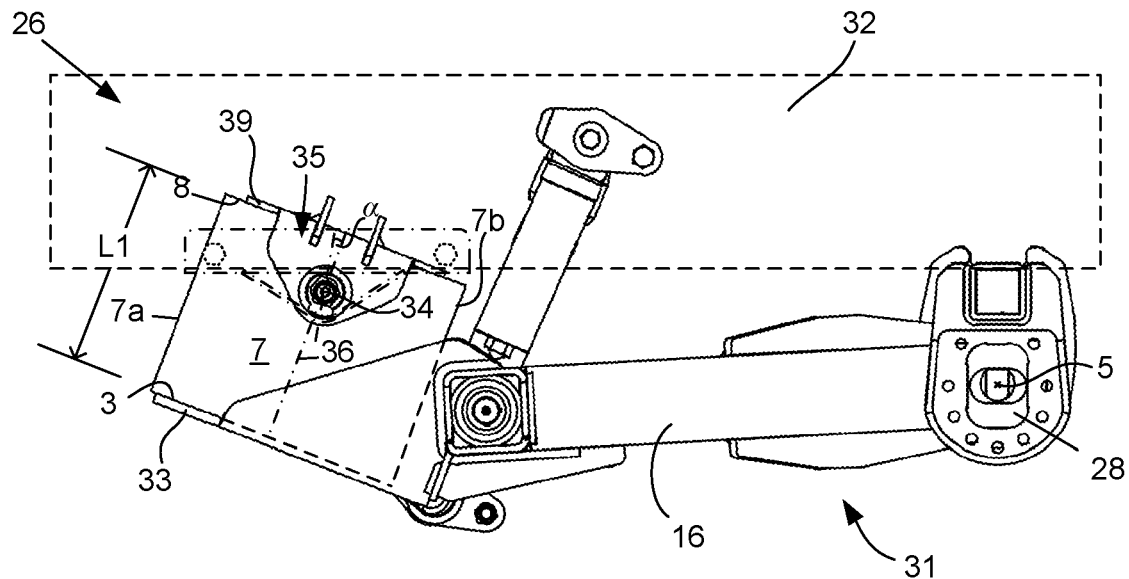
FIG. 3a is a side view of an independent suspension assembly according to a preferred embodiment in a compressed configuration.
Figure 3B:
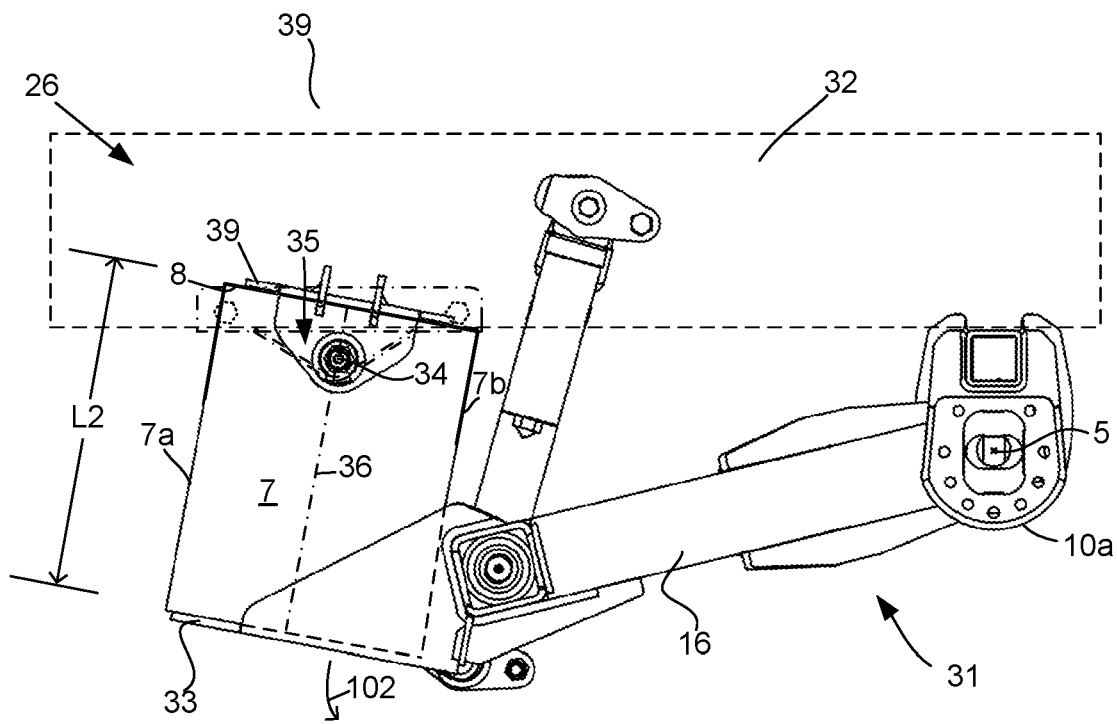
FIG. 3b is a side view of an independent suspension assembly according to a preferred embodiment in an extended configuration.
Figure 4:
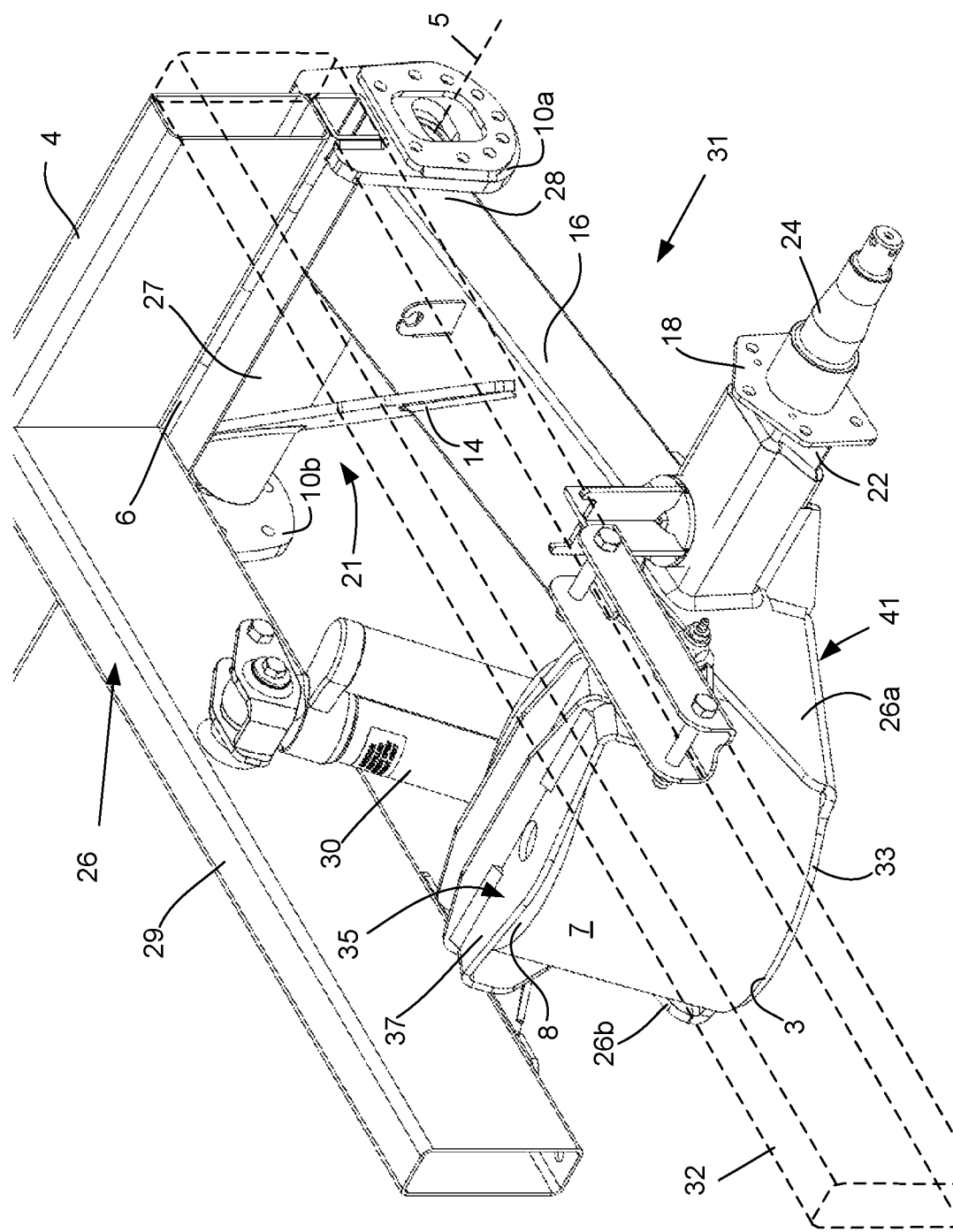
FIGS. 4 and 5 are views of an independent suspension assembly according to a preferred embodiment installed on members of a chassis of a vehicle.

FIG. 3a is a side view of an independent suspension assembly 31 according to a preferred embodiment of the invention shown in side view with the resilient member in the form of airbag 7 shown in a compressed state. FIG. 3b is a side view of the independent suspension assembly 31 but shown with the airbag 7 in an extended state. FIGS. 4 and 4 are further views of the independent suspension. Whilst FIGS. 6 to 12 depict details of a pivoting mounting assembly 35 of the independent suspension assembly 31, which is attachable to members, such as members 29, 32 of a vehicle 26 (of which only a small portion of its chassis is visible).

Initially referring to FIGS. 3a and 3b, in a preferred embodiment the independent suspension assembly 31 for a vehicle 26 includes a suspension arm 16 that has a first end 28 which is arranged for pivoting relative to the vehicle 26 about a hinge axis 5.

A resilient member 7, which is shown in the form of an airbag, though it may also or instead be a spring such as a coil spring or elastomeric material such as a non-pneumatic synthetic rubber member. The resilient member 7 has a resilient member axis 36 with an axial length varying between a first axial length L1 in a compressed state of the resilient member 7 and a second axial length L2 in an extended state of the resilient member 7. The resilient member 7 has remote and near sides 7a, 7b relative to the hinge axis 5 with a lower end 3 or base that extends from the near side 7a to the remote side 7b. The lower end is rigidly fastened, either directly or indirectly to the suspension arm. For example, the lower end of the resilient member may be rigidly fastened to a suitably shaped portion of a suspension arm or fastened to another member such as support member 33, which is in turn rigidly fastened directly to the suspension arm 16 or rigidly fastened to another member that is rigidly directly fastened to the suspension arm 16. By "rigidly" it is meant that the fastening of the lower end of the resilient member is not a pivoting connection such as by means of a pivot or spherical bearing. The entire lower end of the resilient member need not be fastened in order to achieve a rigid, non-pivoting fastening.

Suspension assembly 31 also includes a pivoting mounting assembly 35 which is attachable to the vehicle 26 and which defines a resilient member pivot axis 34. An upper end 8 of the resilient member 7 is fast with the pivoting mounting assembly 35 so that the resilient member 7 is pivotable about the resilient member pivot axis 34.

In operation, the suspension arm 16 pivots about the hinge axis 5 and the axial length of resilient member axis 36, and also the orientation (e.g. the angle of axis 36) of the resilient member 7 varies. In consequence, the pivoting mounting assembly pivots about the resilient member pivot axis 34. The pivoting of the suspension arm and the pivoting of the pivoting mounting assembly are each in a common direction, for example they are both clockwise or both anti-clockwise as viewed in FIGS. 3a and 3b. Consequently, the pivoting of the suspension arm and of the pivoting mounting assembly act in concert to reduce a difference in lengthening between the remote side 7a and near side 7b of the resilient member 7 compared to fastening the top 8 of the resilient member 7 directly to the vehicle 26 as has been discussed in relation to the prior art arrangement shown in FIGS. 1 to 3. The change in orientation of the resilient member 7 as it pivots about resilient member pivot axis 34 and progresses from the extended state to the compressed state results in the resilient member axis 36 in the compressed state (FIG. 3a) making an acute angle α with the resilient member axis 36 in the extended state (FIG. 3b).

It will be observed that in use the resilient member pivot axis is located above the hinge axis in the presently described embodiment though that need not be the case in other embodiments.

In the presently described embodiment a stub axle 24 for a wheel extends laterally between the hinge axis and an end of the support member 33 and more particularly, from the remote end of the suspension arm 16 adjacent the support member 33 so that a compact suspension assembly is provided.

Figure 5:
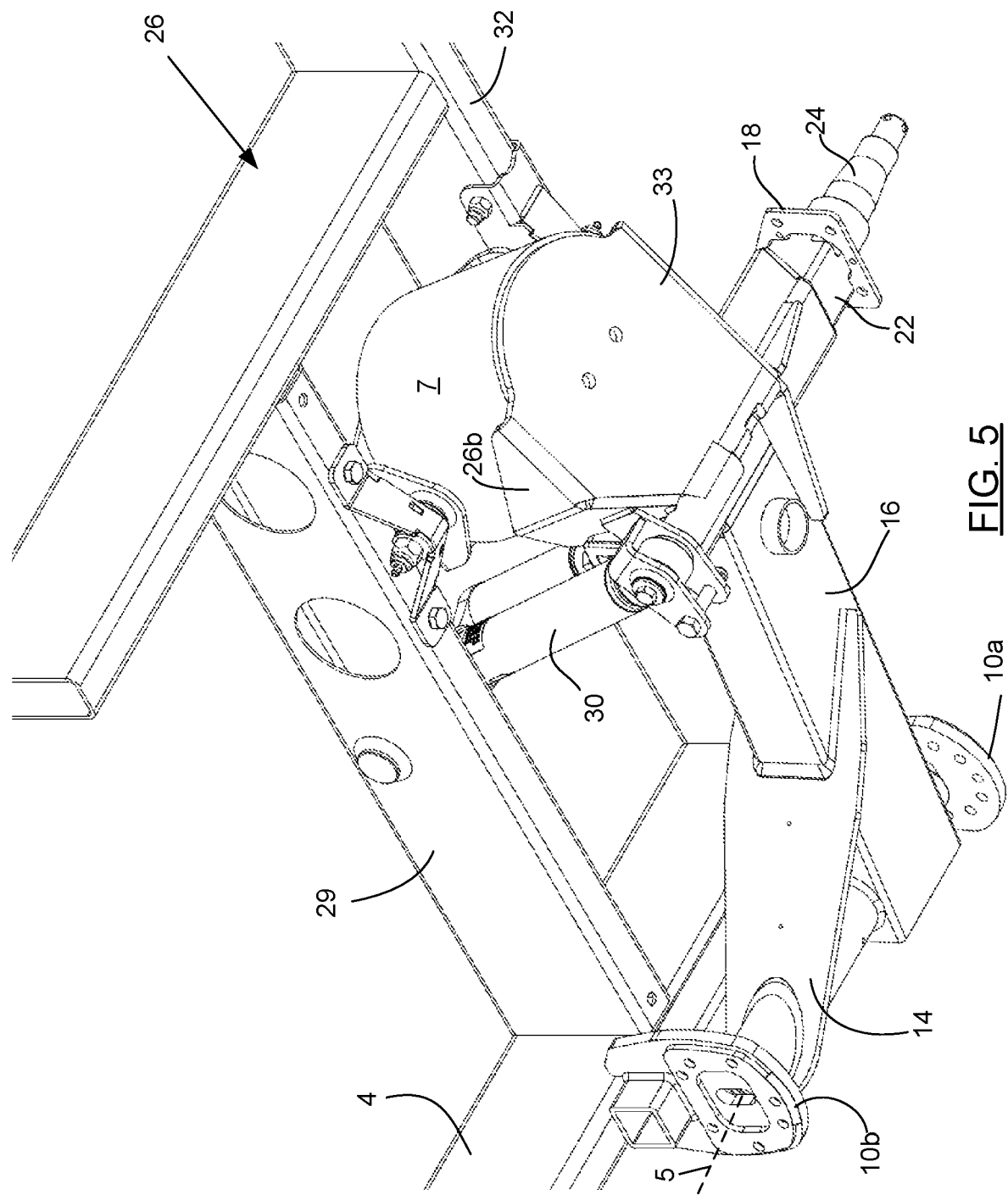

FIG. 4 is a view of the outer side and top of an independent suspension assembly 31 according to an embodiment of the present invention shown in use, mounted to chassis members 29 and 32 of a trailer 26. FIG. 5 is a view corresponding to FIG. 4 of the underside and inner side of the independent suspension assembly 31.

The suspension assembly 31 comprises a trailer mounting subassembly 21 which comprises spaced hinge side plates 10a, 10b. A hinge bar 6 spans between and interconnects the hinge side plates 10a, 10b in order to impart rigidity to the trailer mounting subassembly 21. Opposite ends of the hinge bar 6 are received into complementary slots formed into upper ends of the hinge plates 10a and 10b welded thereto. In use the hinge bar 6 is welded or otherwise fastened to a member of a vehicle, such as the cross bar 4 of the trailer 26, to which the independent suspension assembly 31 is installed.

A suspension arm 16 extends from the hinge tube 27. A diagonal stiffening member 14, comprised of steel plate, is connected between the hinge tube 27 and the suspension arm 16 and acts to counteract sideways forces exerted on the suspension arm 16 in use.

A support subassembly 41 is fastened at the end of the suspension arm 16 remote from the trailer mounting subassembly 21. The support subassembly 41 includes side plates 26a and 26b which are welded to and extend from a remote end of suspension arm 16. Between side plates 26a, 26b there spans a support member in the form of support member 33. It will be realised that the support member could be integrally formed with the suspension arm in other embodiments so that it may comprise a portion of the suspension arm.

The support subassembly 41 is provided to support a resilient member, which in the presently described exemplary embodiment comprises air bag 7.

A square section stub axle 22 extends laterally from the remote end of the suspension arm 16. The stub axle 22 is formed of a solid bar of steel with an outer end machined to provide a wheel spindle 24. A brake mounting plate 18 is provided at the base of the spindle 24 for attachment of a wheel brake.

In addition to airbag 7 the support subassembly 41 also serves as a mounting point for a lower end 3 of shock absorber 30. Shock absorber 30 may be provided to act in conjunction with the airbag 7 to assist in providing suspension between the wheel mounted to spindle 24 and the vehicle, for example the trailer, to which the suspension assembly 31 is mounted. The shock absorber 30 is mounted at opposite ends thereof to trailer chassis member 29 and to the support subassembly 41.

An upper end 8 of airbag 7 is fastened to pivot member 37 of pivoting mounting assembly 35. Referring now to FIGS. 6 to 8, pivoting mounting assembly 35 is comprised of pivot member 37 in the form of a transverse plate 39 from opposite ends of which opposed mounting plates 45a, 45b extend at right angles.

Transverse plate 39 is strengthened by fins 47 which are welded to an outer side of the transverse plate 39.

Mounting plate 45a is pivotally coupled to a chassis anchor in the form of first mounting bracket 49a by a first pivot assembly 51a. Similarly, mounting plate 45b is pivotally coupled to a second chassis anchor in the form of second mounting bracket 49b by a second pivot assembly 51b. The pivoting mounting assembly defines a resilient member pivot axis 34 about which the transverse plate 37, and a resilient member such as airbag 7 mounted thereto, pivots in use.

Figure 10:
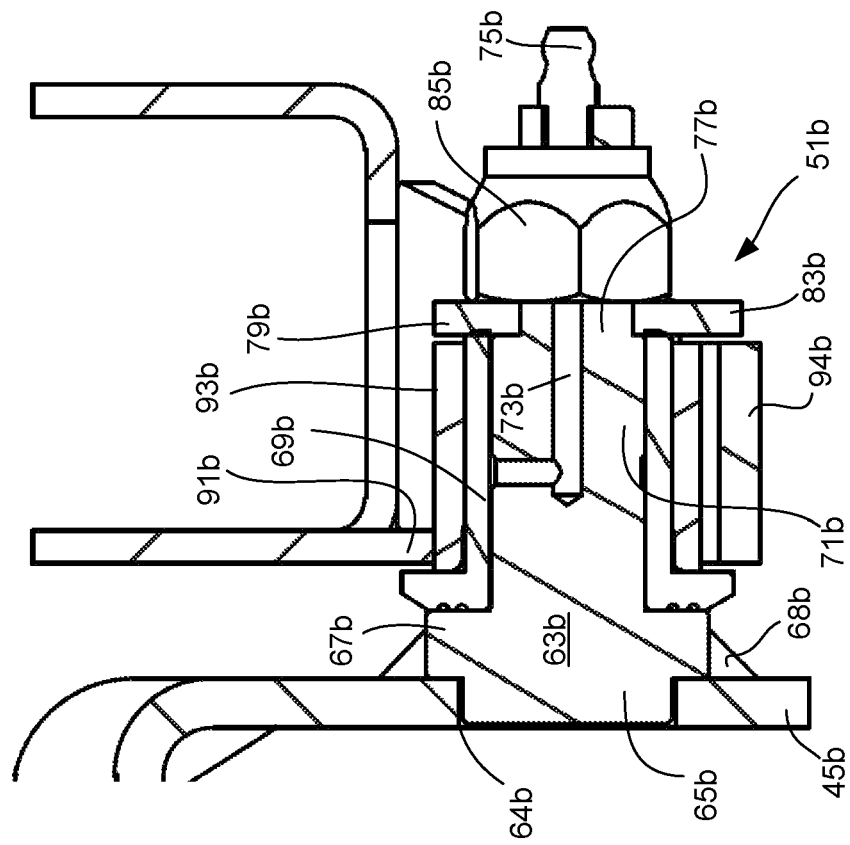
FIGS. 9 and 10 are detail views of cross sections through pivot assemblies of the pivot plate assembly.
Figure 9:
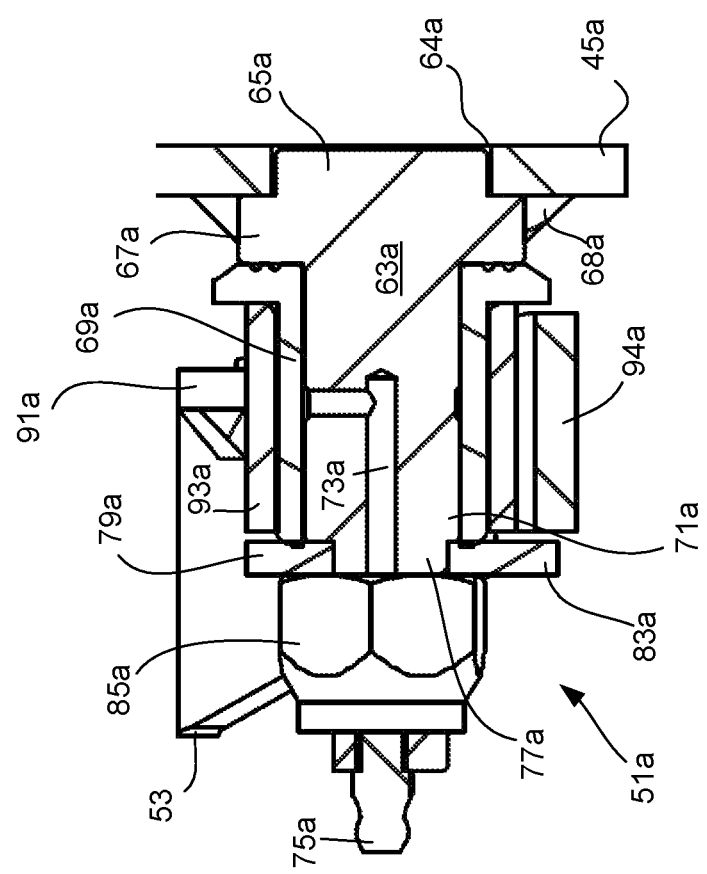

FIGS. 9 and 10 are details of cross-sectional areas through the pivot assemblies 51a, 51b of FIG. 8. Pivot assemblies 51a, 51b each include a pivot axle which in the present embodiment is comprised of pivot stub axles 63a and 63b and which defines a resilient member pivot axis 34. The pivot stub axles 63a, 63b each respectively include a base portion 65a, 65b, a spindle portion 71a, 71b and a flange 67a, 67b between the spindle portion and the base portion. An axial tip 77a, 77b extends from the spindle portion 71a, 71b opposite base portion 65a, 65b and is radially inset from the spindle portion 71a, 71b.

Figure 12:
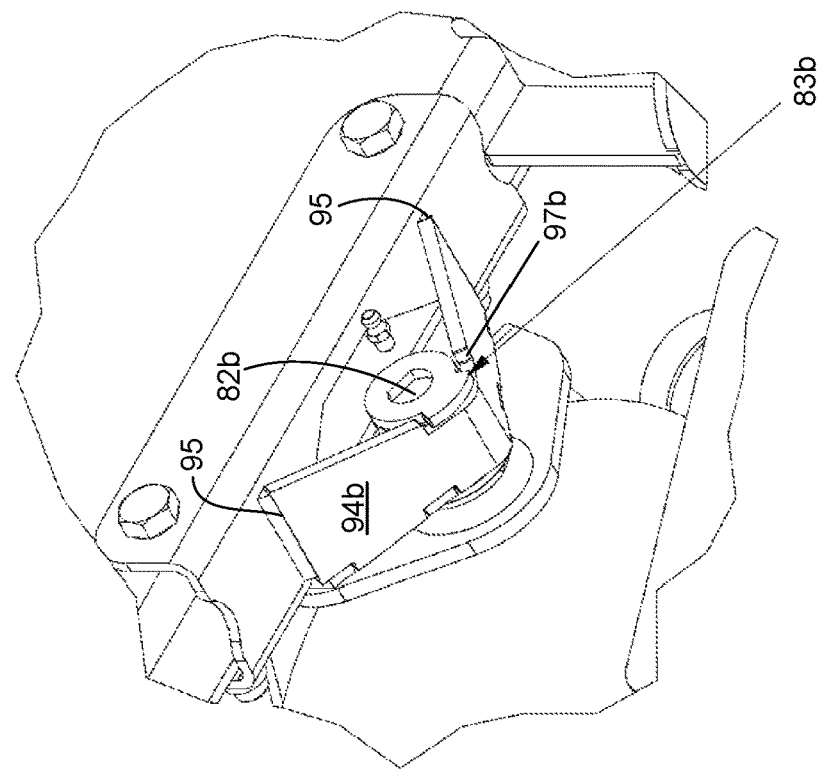
FIGS. 11 and 12 are views of a bracket on a side of the pivot plate assembly in use.

A washer 79a, 79b is fitted over axial tip 77a, 77b and rests against an outer end of the spindle portion 71a, 71b and an outer end of bush 69a, 69b. An opening 82a, 82b (82b is also seen in FIG. 12) through the washer and a portion of the tip 77a, 77b are formed with complementary flats so that the washers 79a, 79b are not rotatable about the tips 77a, 77b. A tab 83a, 83b extends radially from the washer 79a, 79b. Axially distal from the washer, the outside of the tip 77a, 77b is threaded and receives a nut 85a, 85b thereon which holds the washer against the spindle portion 71a, 71b and bushes 69a, 69b.

Each base portion 65a, 65b is received into a corresponding hole 64a, 64b through respective mounting plate 45a, 45b. Flange 67a, 67b abuts an outer side of the mounting plate 45a, 45b. The base portion 65a, 65b and the holes 64a, 64b are non-circular in cross section and complementary so that the base portion cannot rotate relative to the plate 45a, 45b. Welds 68a, 68b between the mounting plates 45a, 45b and the flanges 67a, 67b hold the pivot stub axles 63a, 63b fast with their respective mounting plate 45a, 45b. Bushes 69a, 69b locate around respective spindle portions 71a, 71b of the pivot stub axles. Each spindle portion is formed with a lubrication channel 73a, 73b that extends from a grease nipple 75a, 75b to an interface between the bush 69a, 69b and the spindle portion 71a, 71b for applying lubrication thereto.

Each of the mounting brackets 49a, 49b are formed with a vertical plate 91a, 91b which in the presently described embodiment comprises a substantially triangular plate with its apex directed downwardly. A short tube 93a, 93b extends through vertical plate 91a, 91b and is welded about its outside to the triangular plate 91a, 91b. The spindle portion 71a, 71b with bush 69a, 69b thereabout locates within tube 93a, 93b.

An angled strap 94a, 94b extends diagonally down to the tube, around an underside thereof and thence diagonally back up. Strap 94a ends at opposite ends in coplanar horizontal flats 53, 55, each of which have holes therethrough for passage of a shank of a bolt to thereby bolt the first mounting bracket to an underside of chassis member 29 as shown in FIG. 4.

The second mounting bracket 49b includes a C-channel portion 57 which locates about a lower side portion of chassis member 32 as shown in FIG. 5 and is bolted thereto by bolts 61 which extend through the C-channel portion 57 and through the chassis member 32. Ends 95 of strap 94b of the second mounting bracket 49b are welded to the underside of the C-channel portion 57.

Figure 11:
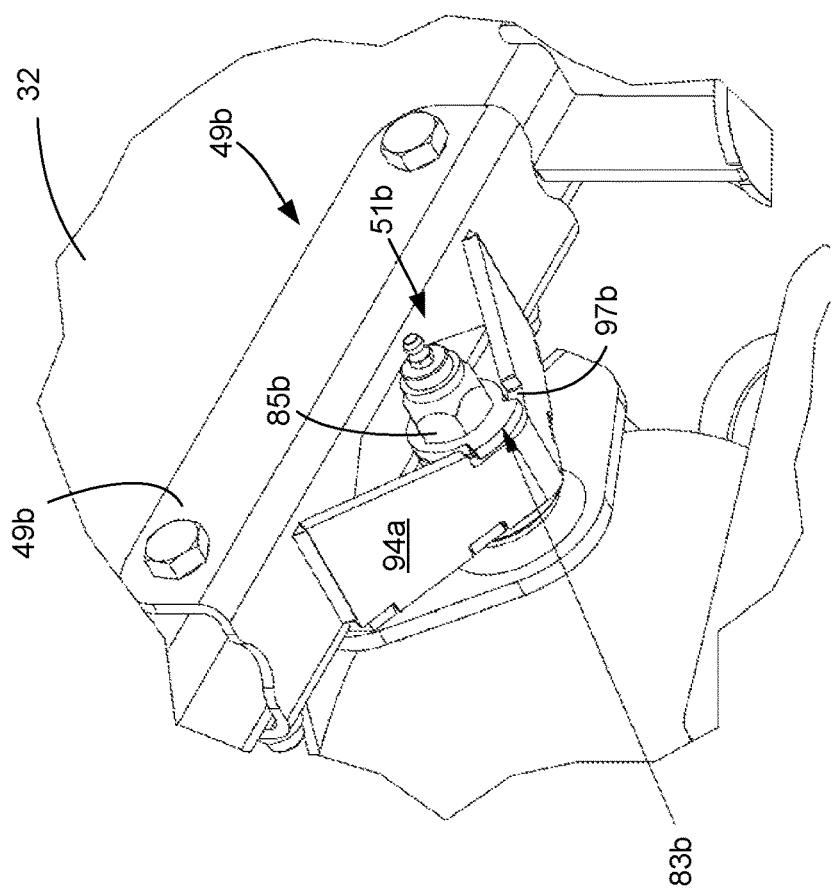

FIG. 11 is a detail view of an outer side of the second mounting bracket 49b. whereas FIG. 12 is a view corresponding to FIG. 11 though with a nut 85b and pivot stub axle of the pivot assembly 51b removed.

As may be seen in FIGS. 11 and 12 with respect to mounting bracket 49b, tab 83a, 83b of washer 79a, 79b locates within a recess 97a, 97b formed about an outer side of the apex of angled strap 93a, 93b. The recess 97a, 97b has edges that describe a wider angle about the pivot stub axle's axis, which comprises the resilient member (e.g. the airbag 7) pivot axis, than the edges of the tab. Consequently, the angle of pivoting of the washer and thus also of the pivot stub axle and the plate is limited.

Figure 12A:
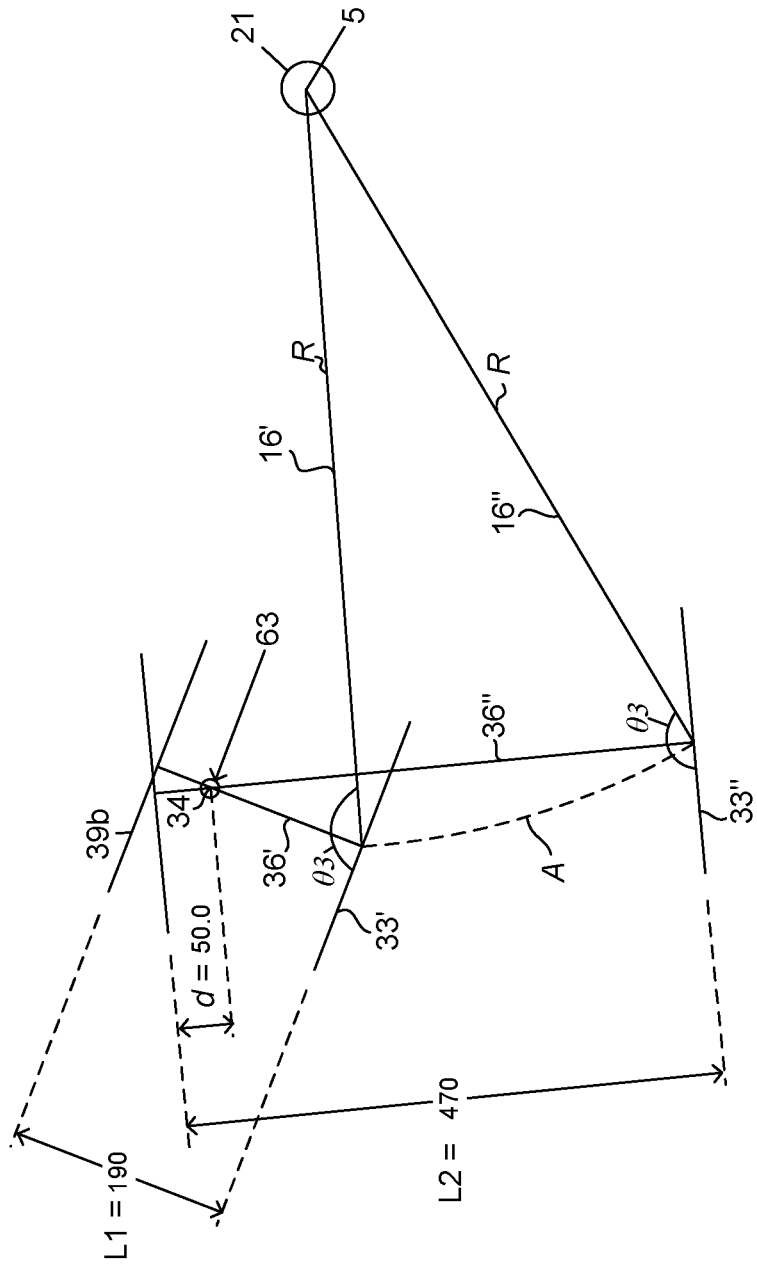
FIG. 12A is a diagram illustrating the geometry of the independent suspension assembly.

FIG. 12A is a diagram illustrating a geometry of the suspension arm that has been described. Some dimensions are provided in millimetres in FIG. 12A and these are purely for explanatory purposes of the presently described invention since other embodiments will have different specific dimensions.

The circle on the right represents the hinge tube 21. Line R represents a radial line from the hinge axis 5 to an intersection of the axis of the resilient member with its base 3. As the suspension arm 16 pivots about hinge axis 5, line R pivots between orientations 16' (e.g. compressed configuration of FIG. 3a) and 16" (e.g. extended configuration of FIG. 3b) with the base 3 following arc A. When suspension arm 16 has brought R to the orientation 16' the airbag 7 assumes a minimum axial length L1 and is under maximum compression. Alternatively, when suspension arm 16 pivots down about hinge axis 5 to bring R to orientation 16" the airbag assumes a maximum axial length L2. The orthogonal distance d from the resilient member pivot axis 34 due to the pivot stub axles 63a, 63b (indicated simply as 63 in FIG. 12A) to the underside of the pivot plate 39, which is where the upper end 8 of the airbag 7 mounts, was set to 50 mm in the present example. The airbag maximum extension and minimum extension lengths 7" and 7' for the selected airbag were set to 470 mm and 190 mm as indicated. The intersection of lines 36' and 36", i.e. the axis of the resilient member in the compressed and extended states, describe an acute angle. The intersection of lines 36' and 36" is where the resilient member pivot axis 34, due to the pivot stub axles 63a, 63b, is most preferably positioned relative to the axis of the hinge tube 21. Changing the angle 83 of the support member 33 moves the axis of the pivot assembly 63 about so that it is feasible to position mounting brackets 49a, 49b on members of the trailer chassis.

The hard pivot limits that are due to tabs 83a, 83b on washers 79a, 79b and recesses 97a, 97b of angled straps 94a, 94b are set to be just outside of the expected normal pivot range of the suspension arm 16 and thus are provided as a fallback safety feature. During normal operation those hard limits should be redundant.

It will be realised that the particular dimensions that are referred to above and in FIG. 12A are exemplary only and other dimensions may be used depending on the application at hand.

Use for the Invention

Figure 13:
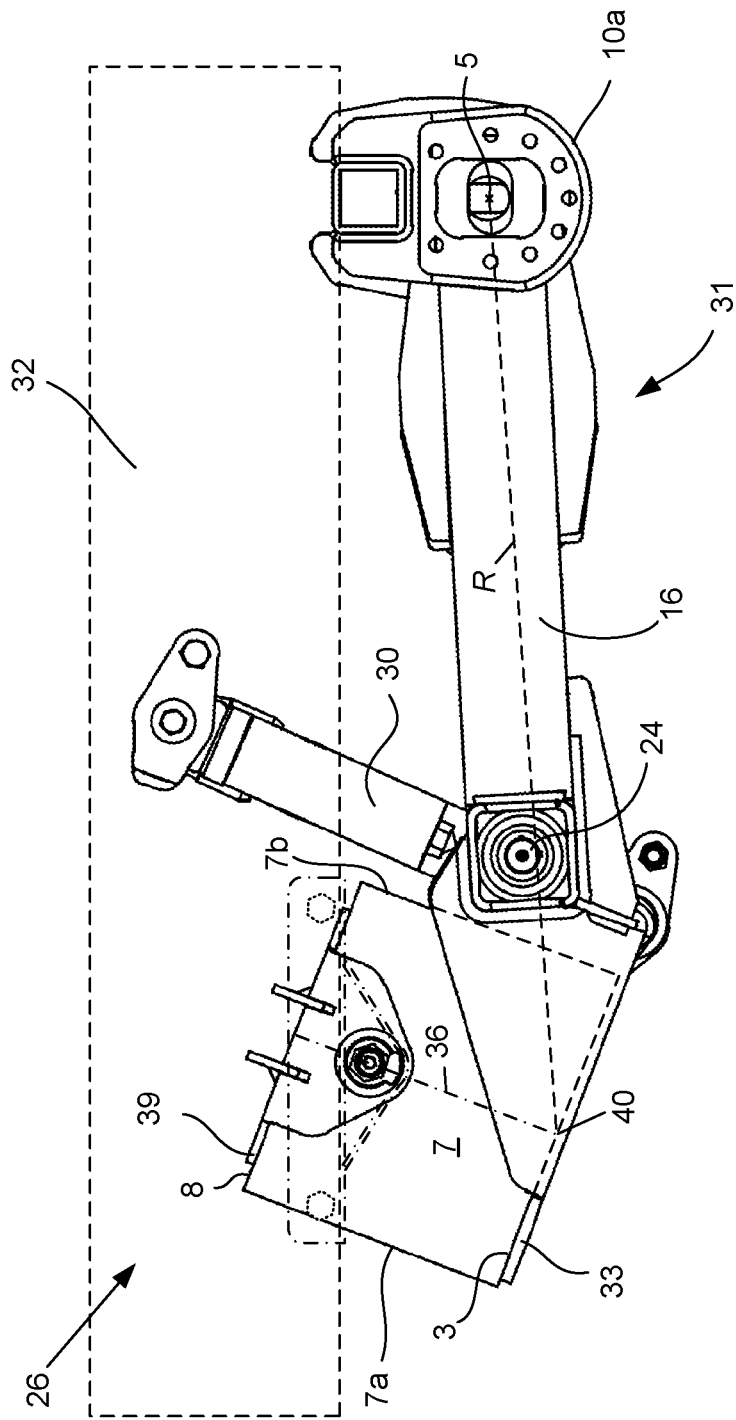
FIGS. 13 to 15 are side views of the independent suspension assembly in use as it proceeds from the compressed configuration through an in-between configuration to the extended configuration.
Figure 14:
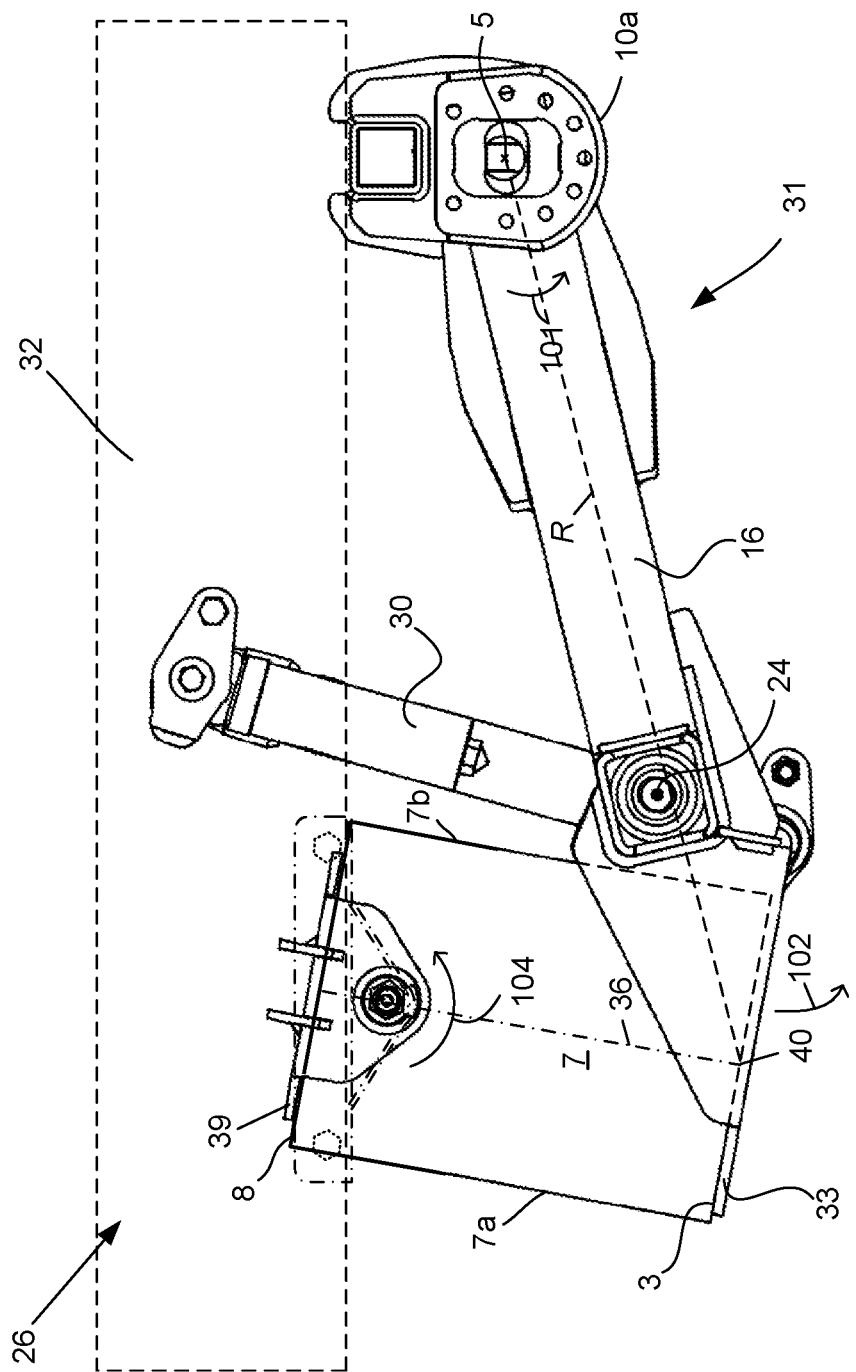
Figure 15:
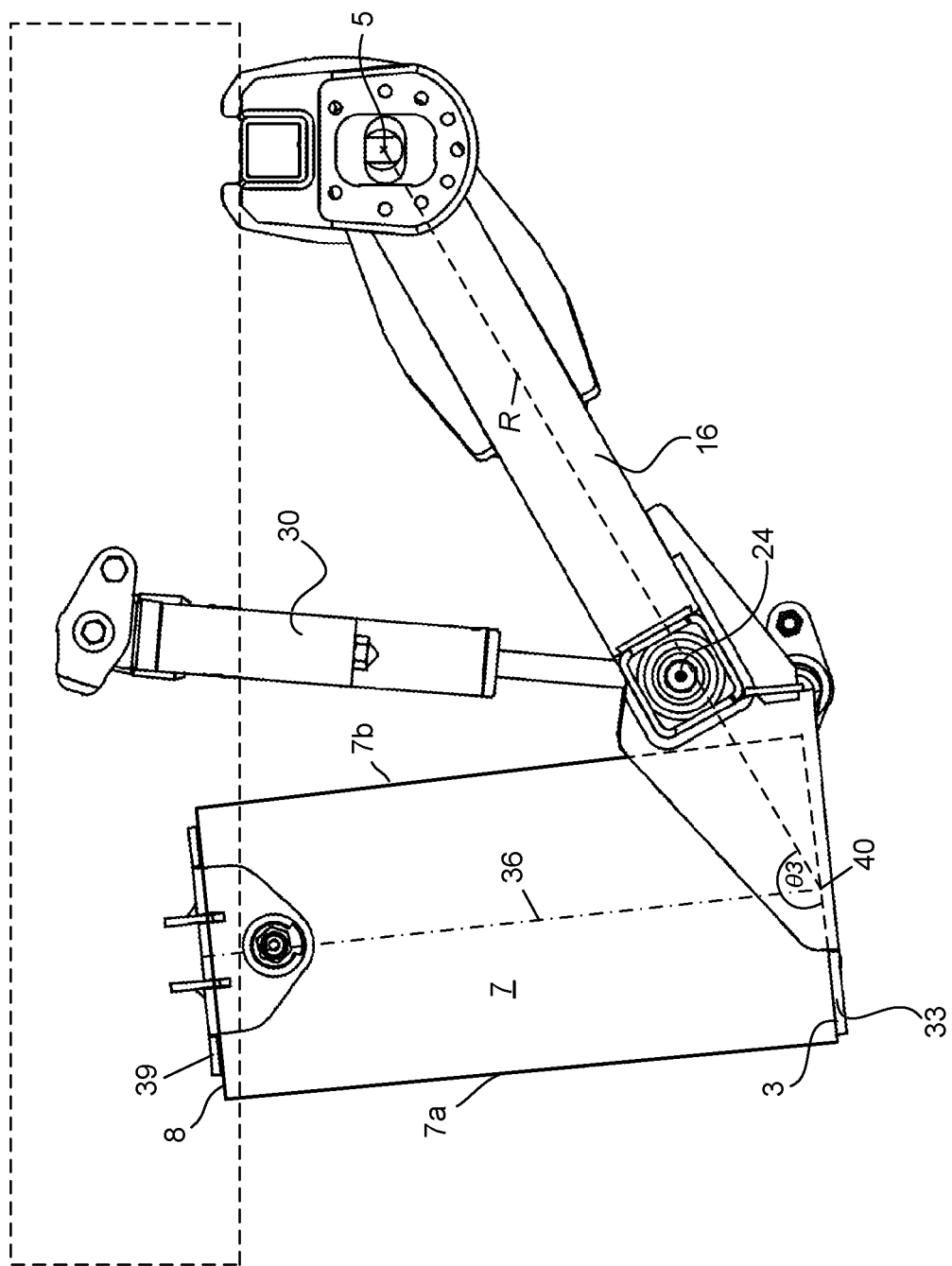

FIGS. 13 to 15 are side views of the independent suspension assembly 31 in use installed to the underside of the chassis of a vehicle, such as a trailer—for example a box trailer or caravan. In FIG. 13 the independent suspension assembly 31 is shown with its suspension arm 16 in a minimum travel position so that it is close to parallel with chassis member 32 and the radial line R has been brought to its most clockwise orientation (relative to the drawing of FIG. 13). Lower end 4 of airbag 7 is rigidly fastened to the support member 33 which is in turn rigidly connected to support arm 16 so that the lower end of the airbag 7 is rigidly fastened to the suspension arm. The upper end 8 of the airbag 7 is fastened to pivot plate 39. The pivot plate 39 has been pivoted clockwise to its pivot limit in the clockwise direction at which point it is substantially parallel with the support member 33. Consequently, the angle between the upper and lower ends of the airbag, which in the present case is about zero since they are parallel, is maintained and thus any difference in lengthening, either an increase in length or a decrease in length, between the sides is minimized.

Subsequently the arm 16 pivots anticlockwise about the hinge axis 5 as indicated by arrow 101 in FIG. 14 thereby causing the support member 33 to swing down as indicated by arrow 102 and moving the far side 7a of the airbag down at a greater speed than the near side 7b so that the pivot plate 39 and the suspension arm pivot anti-clockwise as indicated by arrow 104. Consequently, both the suspension arm 16 and the pivot plate 39 pivot in a common direction being anticlockwise about their respective pivot axes 5, 34. The suspension arm 16 continues to pivot anticlockwise until it reaches a maximum travel limit, which in the present example is, dictated by the shock absorber 30 and which preferably coincides with the rotational pivot limit of the pivot plate 39. At the maximum travel limit position indicated in FIG. 15 the pivot plate 39 has tilted further anticlockwise so that it remains substantially parallel with the support platform 33. Consequently, remote side 7a and near side 7b of air bag 7 are extended through approximately the same distance and the uneven application of force across the airbag that was previously discussed in relation to the prior art arrangement of FIGS. 2 and 3 is avoided. It is believed that the arrangement that has been described is advantageous because wear across the airbag 7 is much more evenly distributed than in the past and for a given airbag the maximum elongation of the airbag is increased so that the travel limit set by the shock absorber can be similarly increased.

FIGS. 3a to 15 are drawn substantially to scale. With reference to FIG. 15, in an embodiment the support member 33 makes an angle (θ3) with a radial line (R) extending from the hinge axis 5 to an intersection 40 of the lower end 3 of the resilient member 7 and the axis 36 of the resilient member 7. In some embodiments 83 ranges between 150 and 162 degrees though it may range between 153 and 159 degrees and in the presently described preferred embodiment 83 is 156 degrees. It will be realised that these examples are provided to assist the skilled addressee and are not intended to be limiting.

In an embodiment a ratio of the axial length (L2) of the axis 36 of the resilient member 7 in a fully extended state to the axial length (L1) of the resilient member in a fully compressed state is between 2.0 and 3.0 and is approximately 2.5 in the embodiment that has been illustrated.

In an embodiment a ratio of a radius (R) of an arc of pivoting (A) (FIG. 12A) of the lower end of the resilient member to the length (L2) of the resilient member in the fully extended state is in the range of 1.2 to 1.6 and is approximately 1.4 in the presently described embodiment.

It will be appreciated that airbag manufacturers place recommended limits on the angular variance of the two ends of an airbag. In prior art independent suspensions, the angular limit is often reached before the airbag becomes fully extended, embodiments of the present invention reduce the angular variation allowing the full travel of the airbag to be used in turn allowing the suspension to be able to travel further since the full travel of the airbag is available. Keeping the ends 3, 8 of the resilient member, e.g. airbag 7 substantially parallel further reduces wear on the airbag and improves stability of the installation even if the extra travel is not utilized.

Embodiments of the present invention, in which the lower end of the resilient member is rigidly attached to the suspension arm with the upper end pivotally mounted to the vehicle, operate in a stable fashion without need for a mechanism such as a linear bearing to maintain the upper and lower ends substantially parallel.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. An independent suspension assembly for a vehicle, the suspension assembly including:
   a suspension arm having a first end arranged for pivoting relative to the vehicle about a hinge axis;
   a resilient member having a resilient member axis with an axial length varying between a first axial length in a compressed state of the resilient member and a second axial length in an extended state of the resilient member, the resilient member having remote and near sides relative to the hinge axis and a lower end extending from the near side to the remote side, the lower end being rigidly fastened to the suspension arm;
   a pivoting mounting assembly attachable to the vehicle and defining a resilient member pivot axis, an upper end of the resilient member being fast with a pivot member of the pivoting mounting assembly whereby the resilient member is pivotable about the resilient member pivot axis;
   wherein as the suspension arm pivots about the hinge axis, the axial length and orientation of the resilient member varies whereby the pivot member pivots about the resilient member pivot axis, the pivoting of the suspension arm and the pivoting of the pivoting mounting assembly being in a common direction to thereby reduce a difference in lengthening between the remote and near sides of the resilient member, wherein the pivoting mounting assembly comprises at least one pivot axle defining the resilient member pivot axis; and wherein the resilient member pivot axis is below the upper end of the resilient member.

2. The independent suspension assembly of claim 1, including a support member that extends from an end of the suspension arm remote from the hinge axis, wherein the lower end of the resilient member is rigidly fastened to the suspension arm.

3. The independent suspension assembly of claim 2, wherein the support member makes an angle (θ4) of between 150 and 162 degrees with a radial line (R) extending from the hinge axis to an intersection of the lower end of the resilient member and the axis of the resilient member.

4. The independent suspension assembly of claim 1, wherein the resilient member comprises an airbag.

5. The independent suspension assembly of claim 1, wherein the pivoting mounting assembly includes a pivot member across the upper end of the resilient member.

6. The independent suspension assembly of claim 5, wherein the at least one pivot axle includes portions extending from opposite sides of the pivot member.

7. The independent suspension assembly of claim 6, wherein the pivot member comprises a pivot plate.

8. The independent suspension assembly of claim 7, wherein first and second pivot assemblies extend from opposed sides of the pivot plate.

9. The independent suspension assembly of claim 8, wherein the first and second pivot assemblies each include a spindle portion.

10. The independent suspension assembly of claim 9, wherein each pivot assembly includes a bush that locates about the spindle portion.

11. The independent suspension assembly of claim 8, wherein the first and second pivot assemblies each comprise a respective pivot stub axle.

12. The independent suspension assembly of claim 11, wherein each pivot stub axle is non-rotatable relative to the pivot member.

13. The independent suspension assembly of claim 11, wherein each pivot stub axle includes a base portion.

14. The independent suspension assembly of claim 13, wherein each base portion locates within holes of respective mounting plates of the pivoting mounting assembly.

15. The independent suspension assembly of claim 11, wherein each pivot stub axle has an associated radially extending member.

16. The independent suspension assembly of claim 15, wherein the radially extending member comprises a tab from a washer that locates non-rotationally around a portion of each respective pivot stub axle.

17. The independent suspension assembly of claim 16, wherein each radially extending member is restricted to pivot within a limited range.

18. The independent suspension assembly of claim 17, wherein each radially extending member is restricted to pivot within a limited range by abutting edges of a respective recess of a respective member of the pivoting mounting assembly.

* * * * *